(12) United States Patent
Fidh et al.

(10) Patent No.: US 10,632,821 B2
(45) Date of Patent: Apr. 28, 2020

(54) METHOD OF CONTROLLING AN AIR PLUME EXPELLED FROM A MOTOR VEHICLE AIR REGISTER

(71) Applicant: FORD GLOBAL TECHNOLOGIES, LLC, Dearborn, MI (US)

(72) Inventors: Steven Nicholas Fidh, Ann Arbor, MI (US); John Robert Tresh, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 565 days.

(21) Appl. No.: 15/433,621

(22) Filed: Feb. 15, 2017

(65) Prior Publication Data
US 2018/0229585 A1   Aug. 16, 2018

(51) Int. Cl.
*B60H 1/34*   (2006.01)
*B60H 1/00*   (2006.01)

(52) U.S. Cl.
CPC ......... *B60H 1/345* (2013.01); *B60H 1/00871* (2013.01); *B60H 1/3421* (2013.01); *B60H 2001/002* (2013.01); *B60H 2001/3464* (2013.01)

(58) Field of Classification Search
CPC .. B60H 1/345; B60H 1/00871; B60H 1/3421; B60H 2001/002; B60H 2001/3464
USPC ....................................................... 454/155
See application file for complete search history.

(56) References Cited

U.S. PATENT DOCUMENTS

| | | | |
|---|---|---|---|
| 5,063,833 A * | 11/1991 | Hara | B60H 1/345 454/152 |
| 5,586,935 A | 12/1996 | Kotoh et al. | |
| 6,340,328 B1 | 1/2002 | Schwandt et al. | |
| 7,997,964 B2 | 8/2011 | Gehring et al. | |

FOREIGN PATENT DOCUMENTS

| | | |
|---|---|---|
| EP | 1867507 B1 | 8/2009 |
| JP | 01181035 A | 7/1989 |
| JP | 2002293133 A | 10/2002 |

OTHER PUBLICATIONS

English Machine Translation of JP01181035A.
English Machine Translation of JP2002293133A.

* cited by examiner

*Primary Examiner* — Grant Moubry
*Assistant Examiner* — Ryan L Faulkner
(74) *Attorney, Agent, or Firm* — David Coppiellie; Price Heneveld LLP

(57) ABSTRACT

A method for controlling an air plume expelled from an air register includes configuring a plurality of vanes of the air register to provide the air plume with a width $W_1$ when in a first position to direct the air plume in a first direction, such as toward an individual in the passenger compartment of the motor vehicle, and a width $W_2$ when in a second position to direct the air plume in a second direction such as away from the individuals where $W_1 > W_2$.

15 Claims, 8 Drawing Sheets

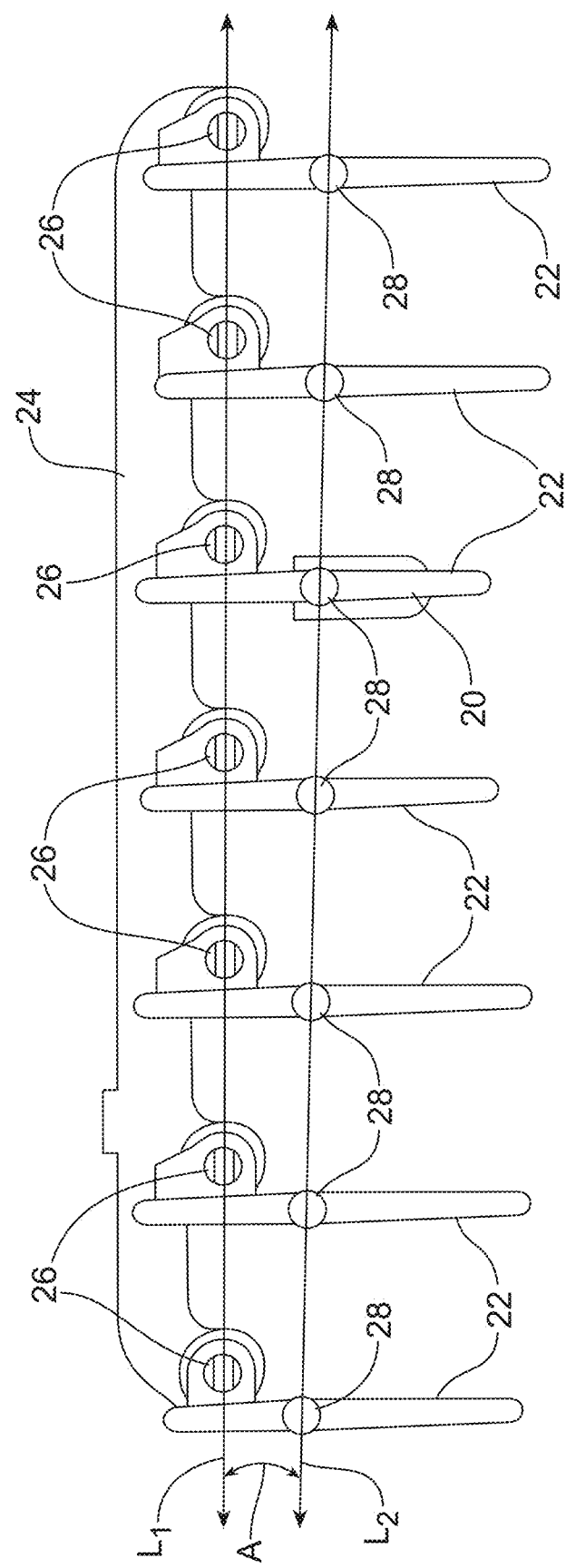

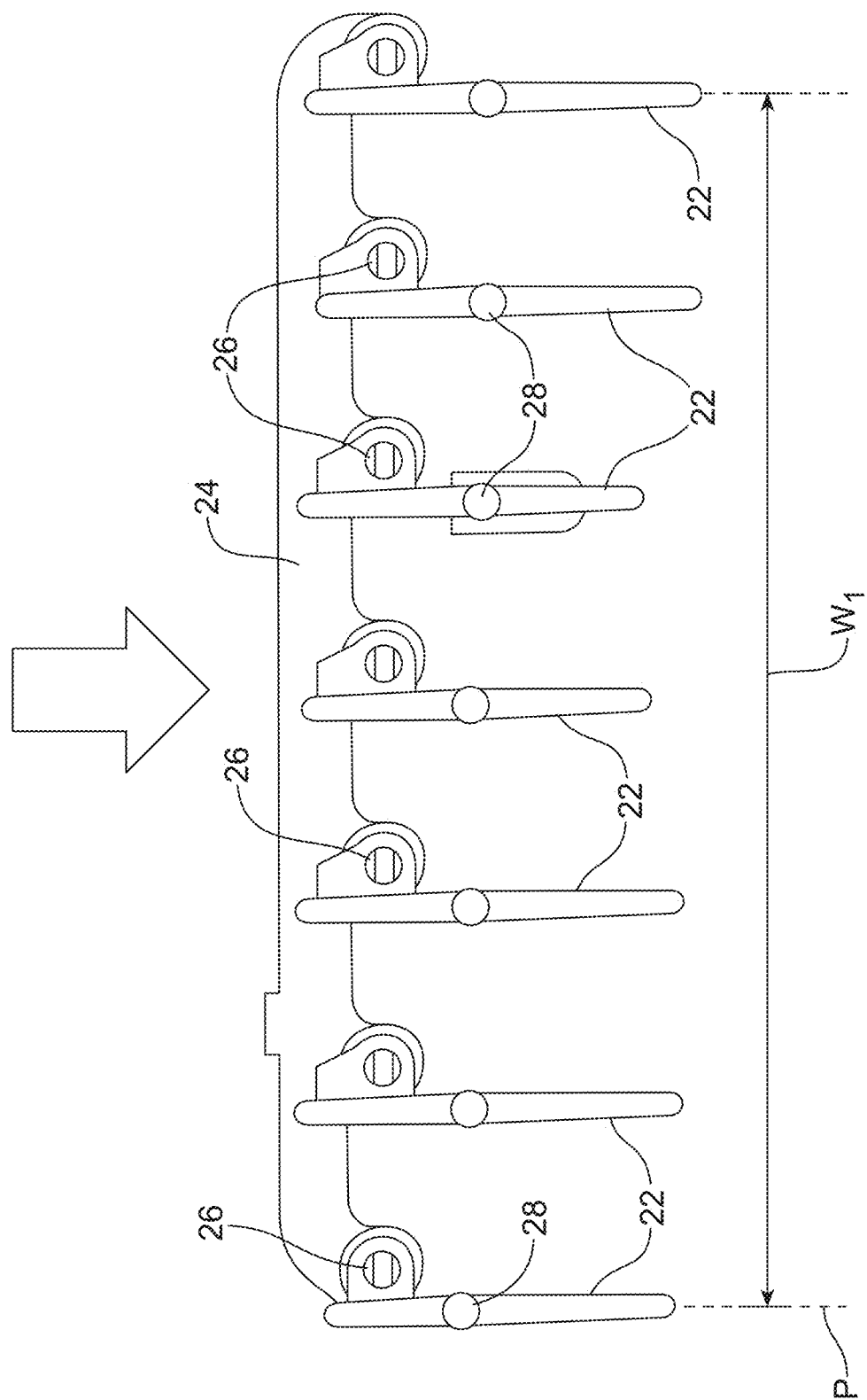

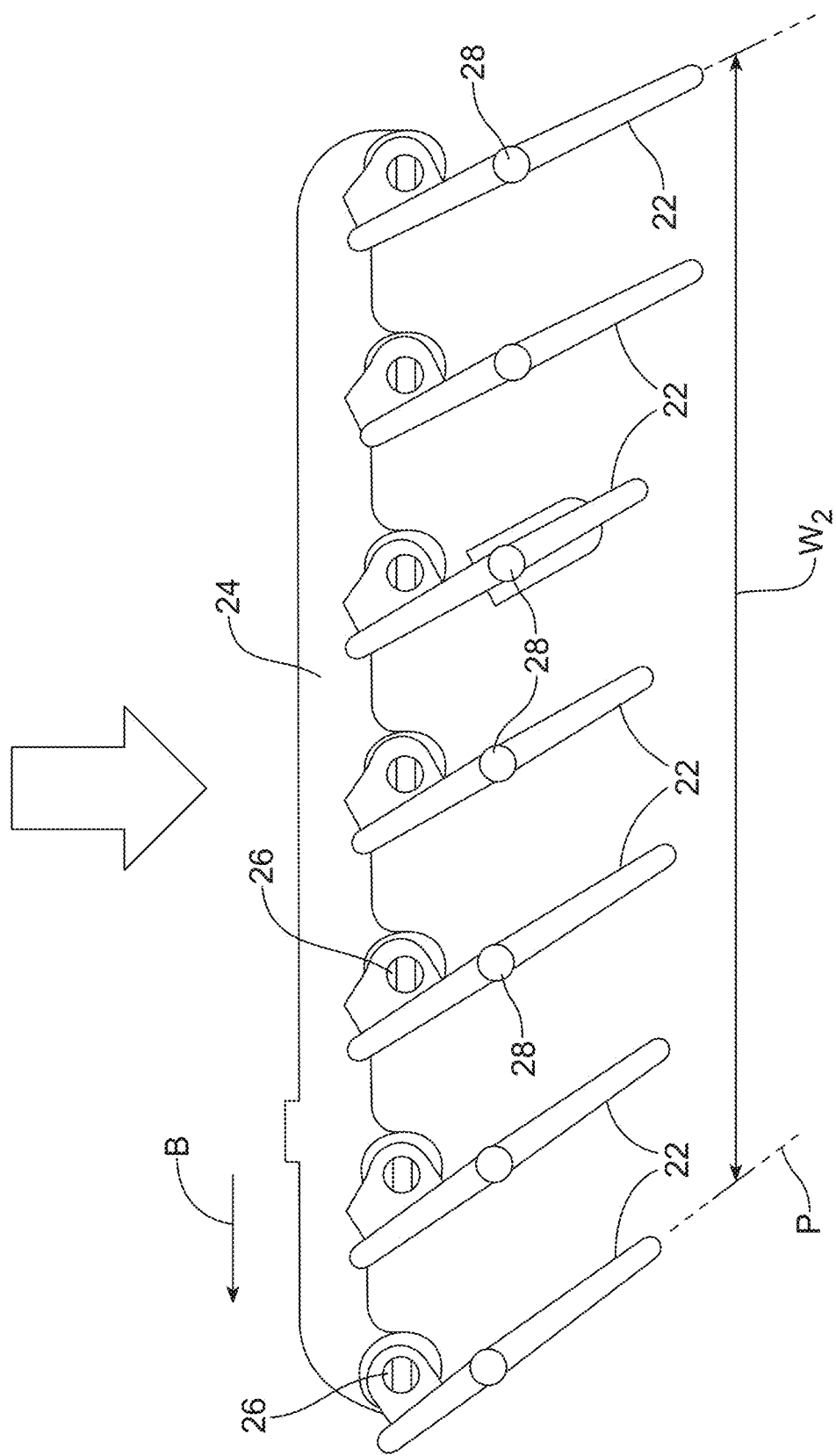

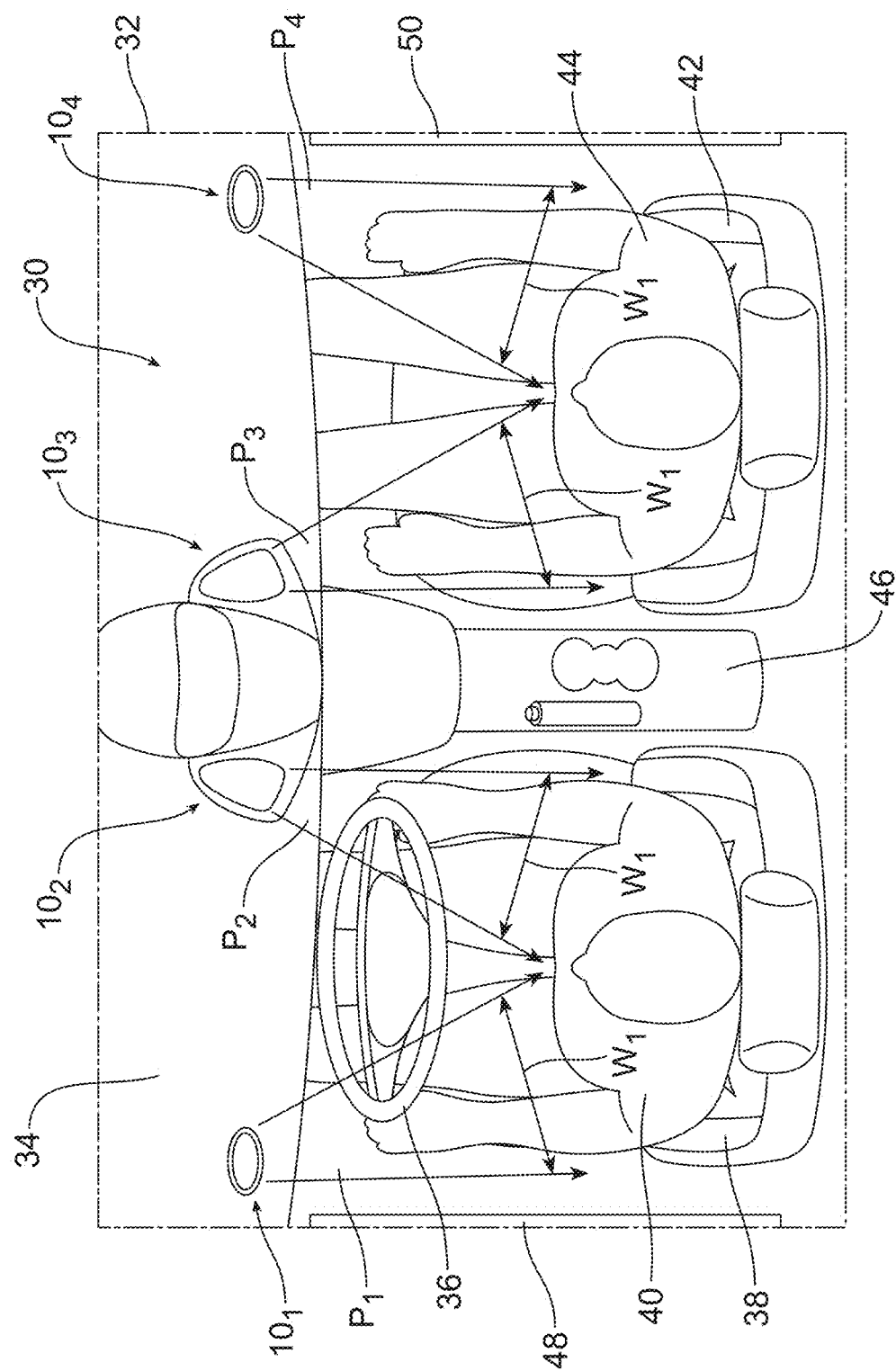

METHOD OF CONTROLLING AN AIR PLUME EXPELLED FROM A MOTOR VEHICLE AIR REGISTER

TECHNICAL FIELD

This document relates generally to the motor vehicle equipment field and, more particularly, to a new and improved method of controlling the air plume expelled from an air register of the motor vehicle in order to better meet the needs and preferences of the motor vehicle occupants.

BACKGROUND

Styling and design considerations often lead to a motor vehicle incorporating air registers in the dashboard having a high aspect ratio: that means those registers are often much wider than they are tall. Such registers have a tendency to produce or discharge a relatively wide air plume. While the wide air plume may be desired when directed toward an occupant of the motor vehicle in order to provide air flow across the entire width of the individual, such a wide air plume may be detrimental or undesired when the individual user wishes to direct the air plume away from the individual toward the side window of the motor vehicle or the center console area between the front seats of the motor vehicle. More specifically, in this instance, the wide width of the air plume makes it difficult to adjust the air register so that the air plume does not contact the individual. Further, the wide dispersion pattern of a wide air plume limits the ability of the air stream to penetrate deep into the passenger compartment of the motor vehicle and provide more rapid and complete conditioning of the air within the passenger compartment of the motor vehicle in accordance with the desires of the user.

This document relates to a new and improved method of controlling an air plume expelled from an air register in order to better meet the needs and desires of the individual occupants of the passenger compartment of a motor vehicle.

SUMMARY

In accordance with the purposes and benefits described herein, a new and improved method is provided for controlling an air plume expelled from an air register of a motor vehicle. That method comprises configuring a plurality of vanes of the air register to provide the air plume with a width $W_1$ when in a first position to direct the air plume in a first direction and a width $W_2$ when in a second position to direct the air plume in a second direction wherein the $W_1 > W_2$.

That method may include the step of rotating the vanes along a vane pivot line. Further, that method may include the step of connecting a link to the plurality of vanes along a link pivot line. In addition the method may include orienting the link pivot line with respect to the vane pivot line so as to define an included angle of between 0.1 degrees and 5.0 degrees. In yet another possible embodiment, the method includes orienting the link pivot line with respect to the vane pivot line so as define an included angle of between 1.0 degrees and 3.0 degrees.

The method may also include the step of directing the air plume toward a side window of a motor vehicle when the plurality of vanes are in the second position. In other possible embodiments the method may include directing the air plume over a center console between front seats of a motor vehicle when the plurality of vanes are in the second position. Still further the method may include rotating the plurality of vanes at a non-uniform rate of rotation in order to control the varying width of the air plume.

In accordance with yet another aspect, a method is provided of circulating air from an air register in a motor vehicle. That method comprises the steps of expelling air from the air register in a relatively wide plume when directed toward a vehicle occupant and expelling air from the air register in a relatively narrow plume when directed toward a side window.

Further, in accordance with yet another aspect, a method is provided of circulating air from an air register in a motor vehicle comprising the steps of expelling air from the air register in a relatively wide plume when directed toward a vehicle occupant and expelling air from the air register in a relatively narrow plume when directed toward a center console.

In the following description, there are shown and described several preferred embodiments of the method of controlling an air plume expelled from an air register and method of circulating air from an air register in a motor vehicle. As it should be realized, the methods are capable of other, different embodiments and their several details are capable of modification in various, obvious aspects all without departing from the methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the methods and the air registers utilized to perform the methods and together with the description serve to explain certain principles thereof.

FIG. 4 is a detailed plan view of a plurality of vanes illustrating the geometry of the link pivot line with respect to the vane pivot line.

FIG. 5a is a plan view of the plurality of vanes illustrated in FIG. 4 showing those vanes oriented at an angle wherein the vanes are parallel at a desired maximum width plume position.

FIG. 5b is a view similar to FIG. 5a but illustrating the plurality of vanes oriented at a rotation angle wherein the vanes converge and provide a condensed or narrower air plume.

Figure 6B:
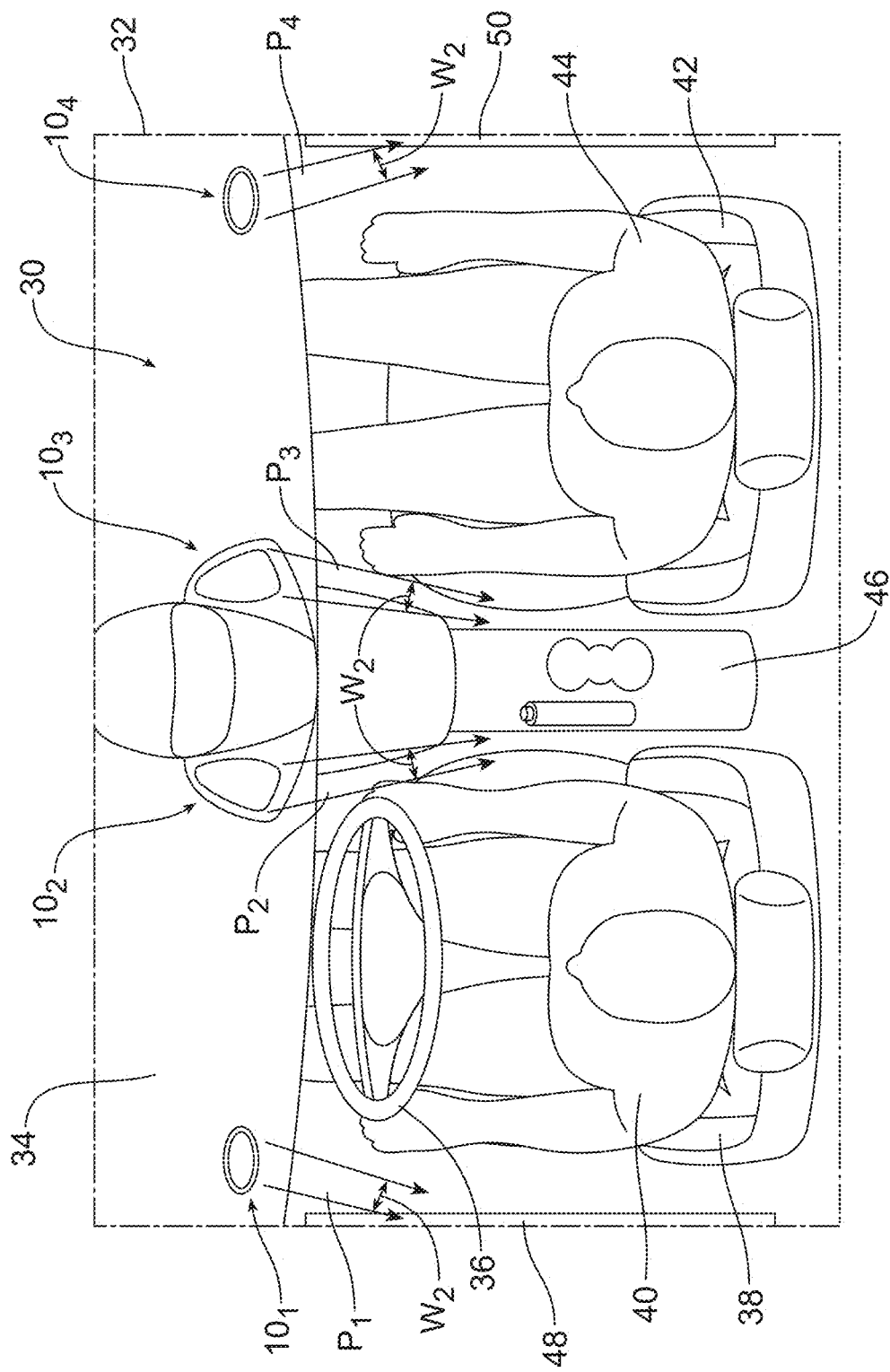
FIG. 6a is a schematic illustration of a passenger compartment of a motor vehicle illustrating how air registers on the dashboard of the motor vehicle may be oriented toward the individual passengers and provide an air plume of relatively wide width for best rapid cooling and heating comfort of those individuals.

FIG. 6b illustrates the same passenger compartment and air registers illustrated in FIG. 6a but redirected and oriented away from the individuals toward the side windows and center console of the motor vehicle so as to provide an air plume of relatively narrow width that does not impinge upon the individuals but penetrates deeper into the passenger compartment for conditioning of all the air in the passenger compartment including air near the headliner so as to provide a more stable and consistently conditioned environment within the passenger compartment of the motor vehicle.

Reference will now be made in detail to the present preferred embodiments of the method, examples of which are illustrated in the accompanying drawing figures.

DETAILED DESCRIPTION

Figure 1:
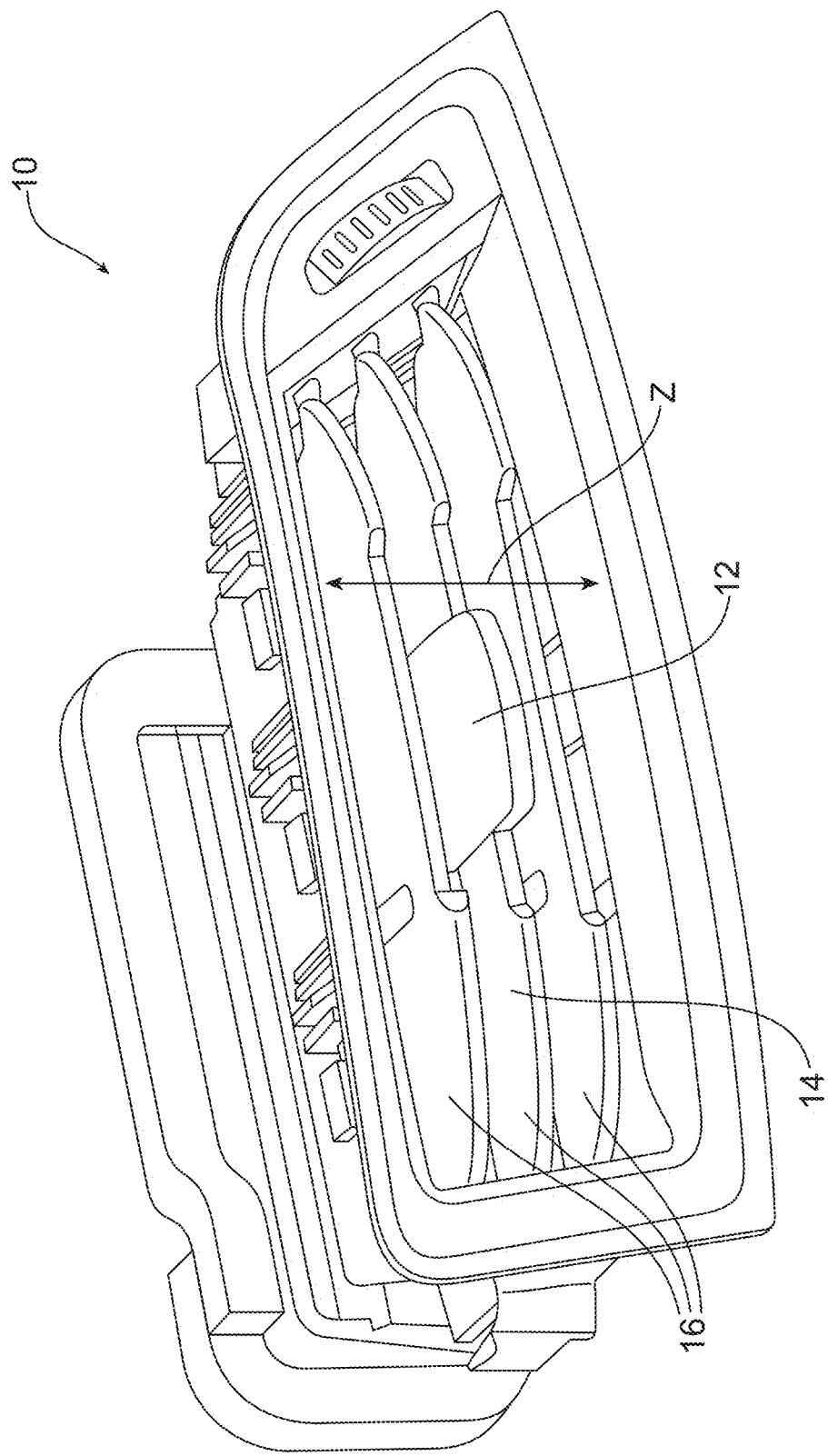
FIG. 1 is a perspective view of an air register for controlling an air plume expelled by the air register.
Figure 2:
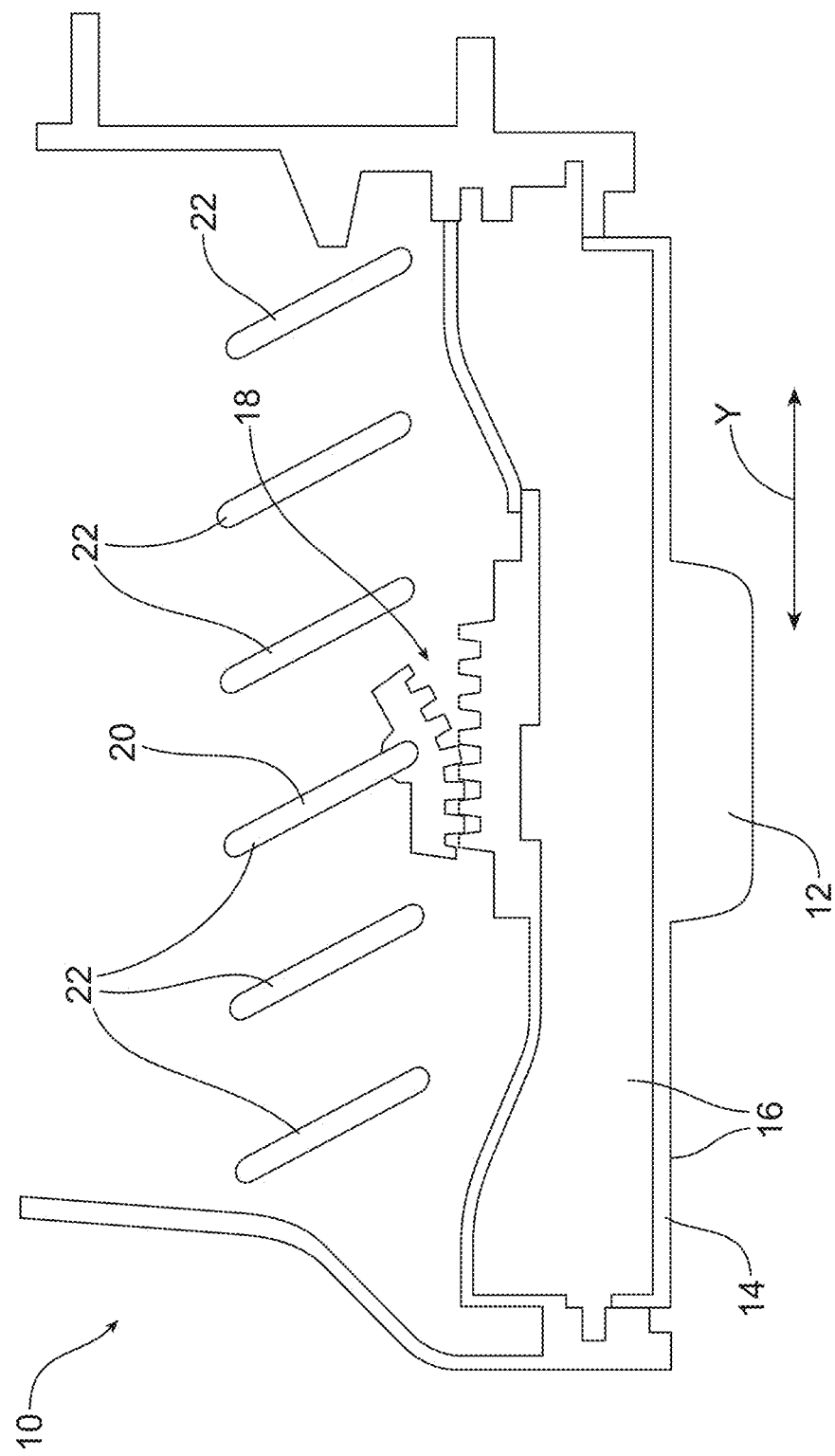
FIG. 2 is a schematic illustration of the air register including the control tab for operating and controlling the positioning of a first set of vanes utilized to direct the air plume along a Z or vertical axis of the motor vehicle and a second set of vanes utilized to direct the air plume along a Y or lateral axis of the motor vehicle.
Figure 3:
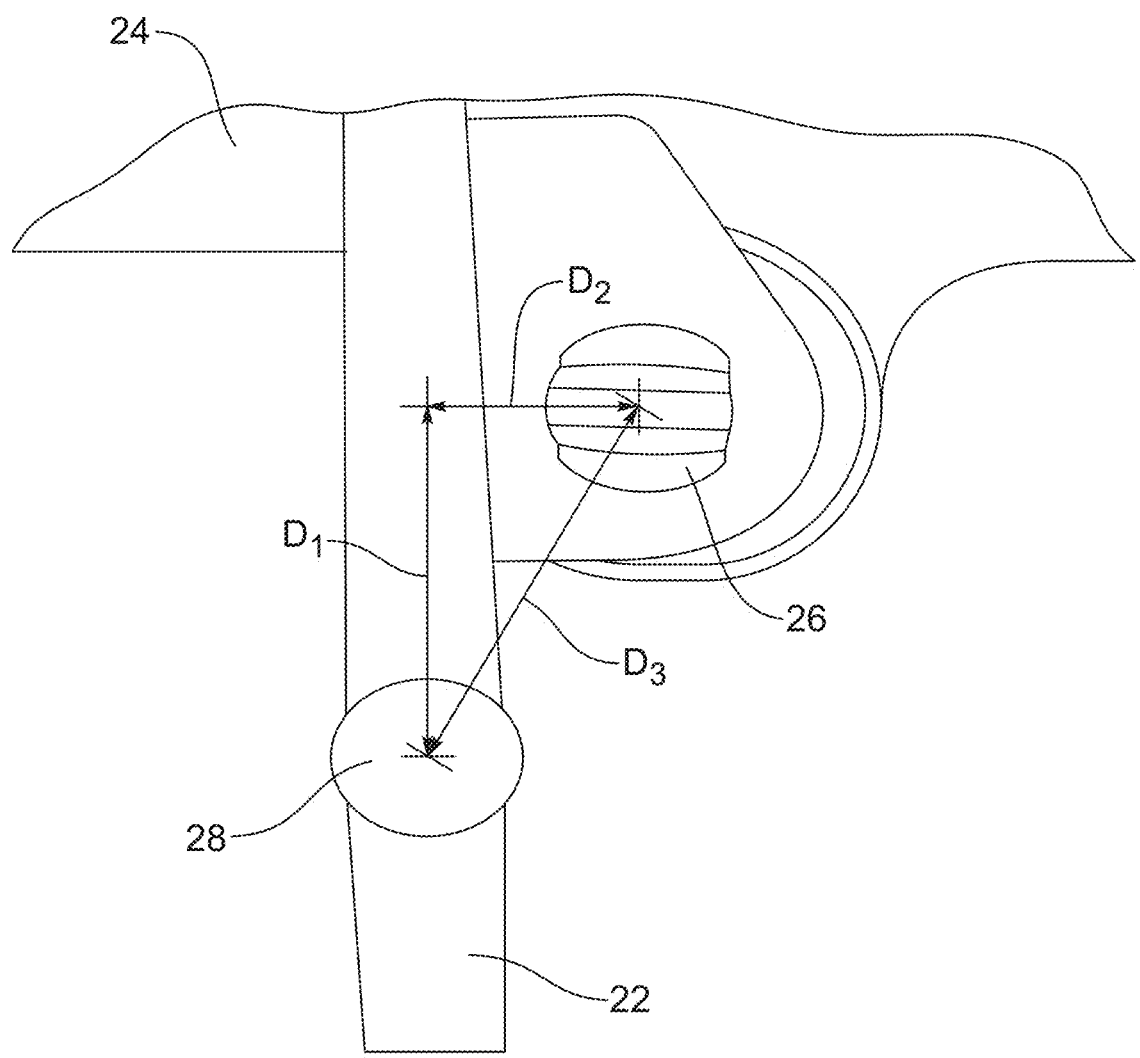
FIG. 3 is a detailed illustration of the geometry of a vane showing a vane pivot for the vane, a link pivot for the vane and the offset between the two.

Reference is now made to FIGS. 1 and 2 illustrating an air register 10 of a type useful in the new and improved method of controlling an air plume expelled from the air register. As illustrated, the air register 10 includes a control tab 12 carried on a vane 14 of a first set of vanes 16 that may be tilted upward or downward in order to allow an operator to adjust the air plume along an angle with respect to the vertical or Z axis of the motor vehicle. As further illustrated, the control tab 12 is connected by means of a gear set 18 to a vane 20 of a second plurality of vanes 22 which may be angularly adjusted to the left or right in order to direct the air plume along the lateral or Y axis of the motor vehicle. As illustrated in FIG. 4, each vane 22 of the plurality of vanes 22 is interconnected by means of a link 24. Thus, as illustrated in detail in FIGS. 3 and 4, each vane 22 includes a link pivot 26 pivotally connecting the vane to the link, and a vane pivot 28 about which the vane is pivoted. As illustrated in FIG. 3, $D_1$ represents the distance between the link pivot 26 and the vane pivot 28 and $D_2$ represents the offset between the link pivot 26 and the vane pivot 28 from the center line of the vane 22.

Reference is now made to FIG. 4 illustrating the vanes of the plurality of vanes 22 all interconnected by the link 24. Line $L_1$ runs through the center of each link pivot 26 of each vane 22 and is referred to as the link pivot line. Line $L_2$ runs through the center of each vane pivot 28 of each vane 22 and is referred to as the vane pivot line. As illustrated, the link pivot line $L_1$ is oriented with respect to the vane pivot line $L_2$ so as to define an included angle A of between about 0.1 degrees and 5 degrees. More specifically, the angle A may be between about 1.0 degrees and 3.0 degrees.

As should be appreciated, since the length pivot line $L_1$ and the vane pivot line $L_2$ define the included angle A, the distance $D_3$ (see FIG. 3a) between the link pivot 26 and vane pivot 28 for each vane 22 varies and, therefore, the vanes 22 of the plurality of vanes 22 rotate at different rates, thereby providing a non-uniform rate of rotation as the control tab 12 is adjusted to orient those vanes 22 with respect to the lateral or Y axis of the motor vehicle. This is best illustrated with the reference to FIGS. 5a and 5b.

FIG. 5a illustrates the link 24 in a first position wherein the vanes 22 are parallel to one another in order to provide an air plume P having a width $W_1$. In contrast, FIG. 5b illustrates the link 24 in a second position (shifted to the left as per action arrow B) wherein the vanes 22 are now oriented at an angle to the original position. Since the vanes 22 rotate at a non-uniform rate, the vanes 22 are no longer parallel but in fact converge so as to provide an air plume P having a second width $W_2$ wherein the first width $W_1 > W_2$.

Reference is now made to FIGS. 6a and 6b which illustrate the benefits and advantages of the new and improved method of controlling the air plume expelled from a vent or air register 10 of a motor vehicle.

More specifically, FIG. 6a illustrates a passenger compartment 30 of a motor vehicle 32. That passenger compartment includes a dashboard 34, a steering wheel 36, a driver's seat 38 including a driver 40, a passenger seat 42 including a passenger 44, a center console 46, a driver's side window 48 and a passenger's side window 50. Four air registers $10_1$-$10_4$ are provided in the dashboard 34. The first air register $10_1$ is provided on the dashboard 34 between the driver's side window 48 and the steering wheel 36. Air registers $10_2$ and $10_3$ are provided at the center of the dashboard 34 above and forward of the center console 46. The fourth air register $10_4$ is provided at the far right side of the dashboard 34 adjacent but forward of the passenger's side window 50.

As illustrated in FIG. 6a, the driver 40 has utilized the control tabs 12 to adjust the link 24 of each air register $10_1$ and $10_2$ to orient the vanes 22 of the plurality of vanes 22 into a "maximum" air plume position so as to provide air plumes $P_1$ and $P_2$ having a relatively wide width $W_1$ to direct air fully across the driver sitting in the driver's seat 38. Similarly, the passenger 44 has utilized the control tabs 12 to orient the links 24 of the air registers $10_3$ and $10_4$ so that the vanes 22 are in a maximum plume width position so as to direct air plumes $P_3$ and $P_4$ toward the passenger 44 and the passenger seat 42. Each air plume $P_3$ and $P_4$ has a width $W_1$ wide enough to provide an air plume extending fully across the passenger 44 for maximum comfort.

Reference is now made to FIG. 6b wherein the driver 40 and passenger 44 have adjusted the various air registers $10_1$-$10_4$ in order to direct the air plumes $P_1$-$P_4$ away from the driver and passenger. More specifically, air register $10_1$ has been adjusted by means of the associated control tab 12 to direct the vanes 22 of the plurality of vanes 22 into a second position wherein the vanes converge and produce an air plume $P_1$ of relatively narrow width $W_2$ directed toward the driver's side window 48.

The air registers $10_2$ and $10_3$ have both been redirected by means of the associated control tabs 12 to direct the vanes 22 of the plurality of vanes 22 thereof into a second position wherein those vanes converge and direct air plumes $P_2$ and $P_3$ over the center console 46 between the driver 40 and passenger 44. As should be appreciated, the plumes $P_2$ and $P_3$ have a relatively narrow width $W_2$ that better allows the air plumes $P_2$ and $P_3$ to penetrate deep into the passenger compartment 30 where they can better condition all the air of the passenger compartment for the extended long term comfort of the driver 40 and passenger 44. This is particularly true if the first set of vanes 16 of the air registers are directed upward toward the headliner of the passenger compartment 30 of the motor vehicle.

Finally, the passenger 44 in FIG. 6b has utilized the control tab 12 to reorient the vanes 22 of the plurality of vanes 22 to direct the air plume $P_4$ toward the passenger side window 50. In this orientation, the vanes 22 converge and the air plume $P_4$ has a relatively narrow width $W_2$ better suited to flow around the passenger 44 along the passenger's side window 50 without impinging upon the passenger.

As should be appreciated from reviewing FIG. 6a, a method of circulating air from any of the air registers $10_1$-$10_4$ in the motor vehicle 32 includes expelling air from any of the air registers in a relatively wide plume when directed toward a vehicle occupant such as the driver 40 or the passenger 44, and expelling air from any of the air registers in a relatively narrow plume when directed toward either the center console 46, the driver's side window 48 or the passenger's side window 50. Advantageously, this allows the driver 40 and passenger 44 to benefit from a relatively wide air plume across all or a greater portion of their bodies when the air plume is directed toward them for maximum cooling or heating effect. At the same time, the air registers $10_1$-$10_4$ automatically compensate and produce a relatively narrow air plume when directed away from the driver 40 and passenger 44 toward the center console 46, driver's side window 48 or passenger's side window 50 once the driver and passenger no longer desire to be directly in the air plume but wish to maintain the HVAC system in operation to provide a consistently conditioned atmosphere within the passenger compartment 30 of the motor vehicle 32.

The foregoing has been presented for purposes of illustration and description. It is not intended to be exhaustive or to limit the embodiments to the precise form disclosed. Obvious modifications and variations are possible in light of the above teachings. For example, the plurality of vanes 22 could be configured to move past parallel and diverge when in the "maximum" plume position if desired. In the illustrated embodiment, the width of the plume varies as the vanes are adjusted laterally. In other embodiments, the width of the plume varies as the vanes are adjusted vertically. In addition, the illustrated embodiments relate to air registers provided in the instrument panel. It should be appreciated that the air registers could be provided at other locations such as in the overhead headliner or a center console or trim panel for use by second and third row operators. All such modifications and variations are within the scope of the appended claims when interpreted in accordance with the breadth to which they are fairly, legally and equitably entitled.

What is claimed:

1. A method of controlling an air plume expelled from an air register, comprising:
    configuring a plurality of vanes of said air register to provide said air plume with a first width $W_1$ when in a first position to direct said air plume in a first direction and a second width $W_2$ when in a second position to direct said air plume in a second direction where $W_1 > W_2$;
    connecting a link to the plurality of vanes along a link pivot line; and orienting the link pivot line with respect to a vane pivot line, along which the plurality of vanes are configured to rotate, so as to define an included angle between 0.1 degrees and 5.0 degrees between the link pivot line and the vane pivot line.

2. The method of claim 1, including rotating said vanes along the vane pivot line.

3. The method of claim 2, including orienting said link pivot line with respect to said vane pivot line such that the included angle between the link pivot line and the vane pivot line is between 1.0 degrees and 3.0 degrees.

4. The method of claim 3, including directing said air plume toward an individual sitting in a seat of a motor vehicle when said plurality of vanes are in said first position.

5. The method of claim 4, including directing said air plume toward a side window of said motor vehicle when said plurality of vanes are in said second position.

6. The method of claim 4, including directing said air plume over a center console between front seats of said motor vehicle when said plurality of vanes are in said second position.

7. The method of claim 1, including directing said air plume toward an individual sitting in a seat of a motor vehicle when said plurality of vanes are in said first position.

8. The method of claim 7, including directing said air plume toward a side window of said motor vehicle when said plurality of vanes are in said second position.

9. The method of claim 7, including directing said air plume over a center console of said motor vehicle when said plurality of vanes are in said second position.

10. The method of claim 7, including rotating said plurality of vanes at a non-uniform rate of rotation as said plurality of vanes are displaced between said first position and said second position.

11. The method of claim 1, including directing said air plume toward a side window of a motor vehicle when said plurality of vanes are in said second position.

12. The method of claim 1, including directing said air plume over a center console of a motor vehicle when said plurality of vanes are in said second position.

13. The method of claim 1, including directing said air plume toward an individual sitting in a seat of a motor vehicle when said plurality of vanes are in said first position.

14. A method of circulating air from an air register in a motor vehicle, comprising: expelling air from said air register in a an air plume having a first width when directed toward a vehicle occupant; and expelling air from said air register with the air plume having a second width that is less than the first width when directed away from the vehicle occupant, wherein said air register includes a plurality of vanes connected to a link along a link pivot line, and the link pivot line is oriented relative to a vane pivot line, along which the plurality of vanes are configured to rotate, so as to define an included angle between 0.1 degrees and 5.0 degrees between the link pivot line and the vane pivot line.

15. The method of circulating air from an air register in a motor vehicle of claim 14, wherein the step of expelling air from said air register in the air plume having the second width when directed away from the vehicle occupant, comprises the step of:
    expelling said air over a center console.

* * * * *